(12) United States Patent
Xu

(10) Patent No.: US 12,507,059 B2
(45) Date of Patent: Dec. 23, 2025

(54) METHOD FOR INFORMATION TRANSMISSION, NETWORK DEVICE, AND TERMINAL

(71) Applicant: GUANGDONG OPPO MOBILE TELECOMMUNICATIONS CORP., LTD., Guangdong (CN)

(72) Inventor: Yang Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 744 days.

(21) Appl. No.: 17/726,922

(22) Filed: Apr. 22, 2022

(65) Prior Publication Data
US 2022/0248215 A1    Aug. 4, 2022

Related U.S. Application Data

(63) Continuation of application No. PCT/CN2020/102811, filed on Jul. 17, 2020.

(51) Int. Cl.
*H04W 8/22* (2009.01)

(52) U.S. Cl.
CPC ..................... *H04W 8/22* (2013.01)

(58) Field of Classification Search
None
See application file for complete search history.

(56) References Cited

U.S. PATENT DOCUMENTS

| | | | |
|---|---|---|---|
| 2002/0120750 A1* | 8/2002 | Nidd | H04L 67/51 709/227 |
| 2018/0013568 A1* | 1/2018 | Muhanna | H04W 12/06 |
| 2018/0132098 A1 | 5/2018 | He et al. | |
| 2018/0279400 A1* | 9/2018 | Faccin | H04W 68/005 |
| 2021/0136849 A1 | 5/2021 | Nimmala et al. | |
| 2022/0256328 A1* | 8/2022 | Xie | H04W 76/28 |

FOREIGN PATENT DOCUMENTS

| | | |
|---|---|---|
| CN | 101179796 A | 5/2008 |
| CN | 110214461 A | 9/2019 |
| CN | 110214462 A | 9/2019 |
| CN | 110463249 A | 11/2019 |

(Continued)

OTHER PUBLICATIONS

3GPP TR 22.834 V17.2.0_pub.date_Dec. 2019 (Year: 2019).*

(Continued)

*Primary Examiner* — Jinsong Hu
*Assistant Examiner* — Alexander J Yi
(74) *Attorney, Agent, or Firm* — Young Basile Hanlon & MacFarlane, P.C.

(57) ABSTRACT

Methods for information transmission, a network device, and a terminal are provided in the disclosure. The disclosure relates to the field of mobile communication. The method includes transmitting a capability parameter to a terminal, where the capability parameter is used to indicate a multi-card capability supported and/or allowed by a network device. The terminal can negotiate with the network device according to the multi-card capability supported and/or allowed by the network device, and adjust communication of multiple UMTS subscriber identity modules (USIMs) in the terminal.

16 Claims, 9 Drawing Sheets

(56) References Cited

FOREIGN PATENT DOCUMENTS

| CN | 110572876 A | 12/2019 |
|---|---|---|
| CN | 111278107 A | 6/2020 |
| CN | 113228763 A | 8/2021 |
| CN | 113228764 A | 8/2021 |
| CN | 113767655 A | 12/2021 |
| EP | 3963969 A1 | 3/2022 |
| WO | 2021015502 A1 | 1/2021 |
| WO | 2021043417 A1 | 3/2021 |

OTHER PUBLICATIONS

S2-2000309_SA_WG2_Meeting_136_AH_13-17_Jan. 2020_Incheon_Korea (Year: 2020).*
Intel, KI #1, Sol #7: Update to remove ENs, SA WG2 Meeting #S2-139-e, S2-2003637, Jun. 1-12, 2020. (7 pages).
Extended European Search Report for EP Application 20945162.4 mailed Sep. 13, 2022. (11 pages).
SA WG2 Meeting #S2-136 Reno, USA, S2-1911890, Samsung, New architectural assumption in MUSIM, Nov. 18-22, 2019, 2 pages.
3GPP SA WG2 Meeting #139E Elbonia, S2-2004712, NTT DOCOMO, Orange, Telecom Italia, Deutsche Telekom, Verizon, AT&T, Architectural Assumption for MUSIM support, Jun. 1-12, 2020, 2 pages.
3GPP TR 23.761 V0.4.0 (Jun. 2020), Technical Specification Group Services and System Aspects; Study on system enablers for devices having multiple Universal Subscriber Identity Modules (USIM) (Release 17), 77 pages.
International Search Report with English Translation for PCT Application PCT /CN2020/102811 mailed Apr. 19, 2021. (12 pages).
Indian First Examination Report for IN Application 202217022048 mailed Mar. 6, 2023. (7 pages).
Chinese Office Action with English Translation for CN Application 202210481883.7 mailed May 13, 2023. (23 pages).
Communication pursuant to Article 94(3) EPC for EP Application 20945162.4 mailed May 15, 2023. (7 pages).
Chinese Second Office Action with English Translation for CN Application 202210481883.7 mailed Jul. 19, 2023. (23 pages).
Chinese Third Office Action with English Translation for CN Application 202210481883.7 mailed Sep. 8, 2023. (16 pages).
3GPP TR 22.834 V0.1.0, 3rd Generation Partnership Project; Technical Specification Group Services and System Aspects; Study on Support for Multi-USIM Devices (Release 17), dated May 2019, 19 pages.
Motorola Mobility, Lenovo, "Solution for MT service delivery when multiple USIMs are registered in the same serving PLMN", SA WG2 Meeting #S2-136AH, S2-2000275, dated Jan. 13-17, 2020, Incheon, South Korea, 5 pages.
OPPO, Nokia, Nokia Shanghai Bell, China Unicom, "Solution for key issue#1 handling of MT service", SA WG2 Meeting #136 AH, S2-2000308, dated Jan. 13-17, 2020, Incheon, Korea, 7 pages.
OPPO, "Updating of solution#1 in TR23.761", SA WG2 Meeting #136 AH, S2-2000309, dated Jan. 13 - 17, 2020, Incheon, Korea, 8 pages.
Notice of Reasons for Refusal and English translation issued in corresponding JP application No. 2022549373 dated Apr. 23, 2024, 6 pages.

\* cited by examiner

METHOD FOR INFORMATION TRANSMISSION, NETWORK DEVICE, AND TERMINAL

CROSS-REFERENCE TO RELATED APPLICATION(S)

This application is a continuation of International Application No. PCT/CN2020/102811, filed on Jul. 17, 2020, the disclosure of which is hereby incorporated by reference in its entirety.

TECHNICAL FIELD

The disclosure relates to the field of mobile communication, and more particularly to methods for information transmission, a network device, and a terminal.

BACKGROUND

Nowadays, with rapid development of mobile communication technology and wide application of terminals, terminals that can support multiple subscriber identity modules (SIMs) gradually appear, where such terminals can be configured with multiple SIMs and perform a communication service of one SIM. However, the terminal only can perform a communication service of one SIM at a same time, and in this process, communication services of other SIMs may be affected.

SUMMARY

Methods for information transmission, a network device, and a terminal are provided in implementations of the disclosure.

According to an aspect of the disclosure, a method for information transmission is provided. The method includes the following. A capability parameter is transmitted to a terminal, where the capability parameter is used to indicate a multi-card capability supported and/or allowed by a network device, and the multi-card capability supported and/or allowed by the network device includes at least one of: supporting or allowing to add service information to a paging message, where the service information is used to indicate a service type corresponding to a data package that triggers the paging message; supporting or allowing the terminal to transmit a request message, to enable the terminal to leave the network connection corresponding to a current UNITS subscriber identity module (USIM); or supporting or allowing to determine, according to a service list, whether to transmit the paging message to the terminal, where the service list contains service information indicative of that the network device is prohibited from transmitting the paging message to the terminal on condition that the terminal is in a radio resource control inactive (RRC-Inactive) state and/or a connection management idle (CM-IDLE) state. The terminal performs communication according to the multi-card capability supported and/or allowed by the network device.

According to an aspect of the disclosure, a method for information transmission is provided. The method includes the following. A capability parameter is received, where the capability parameter is used to indicate a multi-card capability supported and/or allowed by a network device, and the multi-card capability supported and/or allowed by the network device includes at least one of: supporting or allowing to add service information to a paging message, where the service information is used to indicate a service type corresponding to a data package that triggers the paging message; supporting or allowing the terminal to transmit a request message, to enable the terminal to leave the network connection corresponding to a current USIM; or supporting or allowing to determine, according to a service list, whether to transmit the paging message to the terminal, where the service list contains service information indicative of that the network device is prohibited from transmitting the paging message to the terminal on condition that the terminal is in an RRC-Inactive state and/or a CM-IDLE state. Communication is performed according to the multi-card capability supported and/or allowed by the network device.

According to an aspect of the disclosure, a network device is provided. The network device includes a transceiver, a processor, and a memory storing a computer program. The computer program is executed by the processor to cause the transceiver to transmit a capability parameter to a terminal, where the capability parameter is used to indicate a multi-card capability supported and/or allowed by a network device, and the multi-card capability supported and/or allowed by the network device includes at least one of: supporting or allowing to add service information to a paging message, where the service information is used to indicate a service type corresponding to a data package that triggers the paging message; supporting or allowing the terminal to transmit a request message, to enable the terminal to leave the network connection corresponding to a current USIM; or supporting or allowing to determine, according to a service list, whether to transmit the paging message to the terminal, where the service list contains service information indicative of that the network device is prohibited from transmitting the paging message to the terminal on condition that the terminal is in an RRC-Inactive state and/or a CM-IDLE state. The terminal performs communication according to the multi-card capability supported and/or allowed by the network device.

According to an aspect of the disclosure, a terminal is provided. The terminal includes a transceiver, a processor, and a memory storing a computer program. The computer program is executed by the processor to cause the transceiver to receive a capability parameter, where the capability parameter is used to indicate a multi-card capability supported and/or allowed by a network device, and the multi-card capability supported and/or allowed by the network device includes at least one of: supporting or allowing to add service information to a paging message, where the service information is used to indicate a service type corresponding to a data package that triggers the paging message; supporting or allowing the terminal to transmit a request message, to enable the terminal to leave the network connection corresponding to a current USIM; or supporting or allowing to determine, according to a service list, whether to transmit the paging message to the terminal, where the service list contains service information indicative of that the network device is prohibited from transmitting the paging message to the terminal on condition that the terminal is in an RRC-Inactive state and/or a CM-IDLE state. The communication module is configured to perform communication according to the multi-card capability supported and/or allowed by the network device.

BRIEF DESCRIPTION OF DRAWINGS

In order to describe technical solutions of implementations more clearly, the following will give a brief introduction to the accompanying drawings required for describing implementations. Apparently, the accompanying drawings hereinafter described are merely some implementations of the disclosure. Based on these drawings, those of ordinary skill in the art can also obtain other drawings without creative effort.

DETAILED DESCRIPTION

In order to make purposes, technical solutions, and advantages of the disclosure clearer, the following will further describe in detail implementations of the disclosure with reference to the accompanying drawings.

It can be understood that, the terms "first", "second" and so on used in the disclosure can be used to describe various concepts herein, but these concepts are not limited by these terms unless otherwise specified. These terms are only used to distinguish one concept from another.

First of all, briefly introduce a noun involved in implementations of the disclosure.

Multi-card capability: also called multiple UMTS subscriber identity module (MUSIM) capability. Multiple USIMs can be installed in a terminal, and when the terminal performs communication by using network connection corresponding to a USIM, the terminal performs communication by only using network connection corresponding to one USIM at a same time. The terminal determines a multi-card capability supported and/or allowed by a network device, then selects a manner that can support the multiple USIMs to perform communication, and negotiates for that the terminal uses the multiple USIMs to perform communication.

Figure 1:
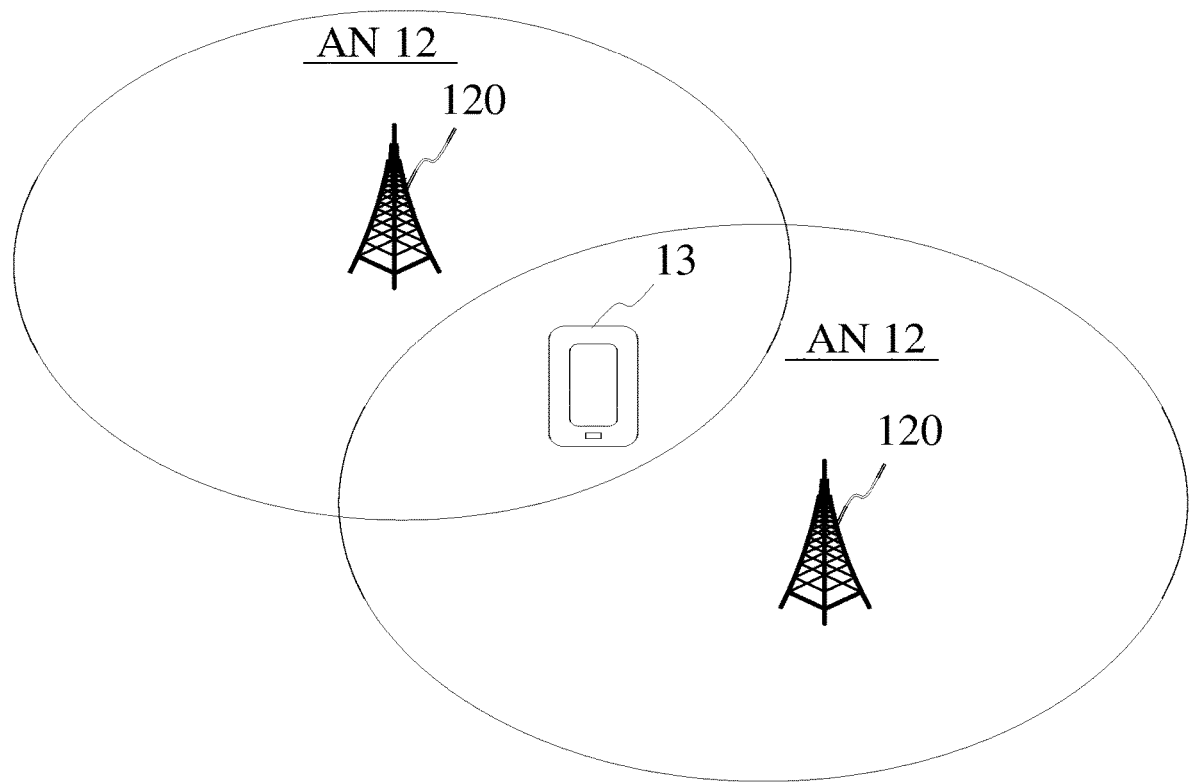
FIG. 1 is a block diagram illustrating a communication system provided in an exemplary implementation of the disclosure.

FIG. 1 is a block diagram illustrating a communication system provided in an exemplary implementation of the disclosure. The communication system may include an access network (AN) 12 and a terminal 13.

The AN 12 includes multiple network devices 120. The network device 120 may be a base station, where the base station is an apparatus that is deployed in the AN and is used to provide a wireless communication function to the terminal. The base station may include various forms of macro base station, micro base station, relay station, access point (AP), etc. In a system with different radio access technologies, a device with a base-station function may have different names, e.g., eNodeB (eNB) in a long term evolution (LTE) system, gNodeB (gNB) in a fifth generation (5G) new radio-based access to unlicensed spectrum (NR-U) system, or the like. With evolution of communication technologies, the description of "base station" may be changed. For sake of convenience in implementations of the disclosure, the apparatus for providing the wireless communication function to the terminal 13 is collectively called AN device.

The terminal 13 may include various handheld devices, in-vehicle devices, wearable devices, and computing devices with a wireless communication function or other processing devices connected to a wireless modem, as well as various forms of user equipments (UEs), mobile stations (MSs), terminal devices, and the like. For convenience of illustration, the above-mentioned devices are collectively called terminal. The network device 120 communicates with the terminal 13 through a certain air interface technology, such as Uu interface.

Technical solutions in implementations of the disclosure can be applicable to various communication systems, for example, a global system of mobile communication (GSM), a code division multiple access (CDMA) system, a wideband code division multiple access (WCDMA) system, a general packet radio service (GPRS), an LTE system, an LTE frequency division duplex (FDD) system, an LTE time division duplex (TDD) system, an advanced LTE (LTE-A) system, an NR system, an evolved system of the NR system, an LTE-based access to unlicensed spectrum (LTE-U) system, an NR-U system, a universal mobile telecommunication system (UMTS), a worldwide interoperability for microwave access (WiMAX) communication system, a wireless local area network (WLAN), a wireless fidelity (WiFi), a next-generation communication system, or other communication systems.

Generally speaking, a conventional communication system supports a limited number of connections and therefore is easy to implement. However, with development of communication technology, a mobile communication system not only supports conventional communication but also supports, for example, device to device (D2D) communication, machine to machine (M2M) communication, machine type communication (MTC), vehicle to vehicle (V2V) communication, vehicle to everything (V2X) system, and the like. Implementations of the disclosure also can be applied to these communication systems or other communication systems.

In related technology, the network device can communicate with the terminal. If the terminal includes multiple USIMs, and at a same time, only one of the multiple USIMs in the terminal can be used for performing communication, communication services of other USIMs may be affected. Therefore, a concept of multi-card capability is proposed. The network device can negotiate with the terminal through the multi-card capability supported and/or allowed by the network device, which is helpful to make the services of the multiple USIMs in the terminal not be affected or be less affected.

Figure 2:
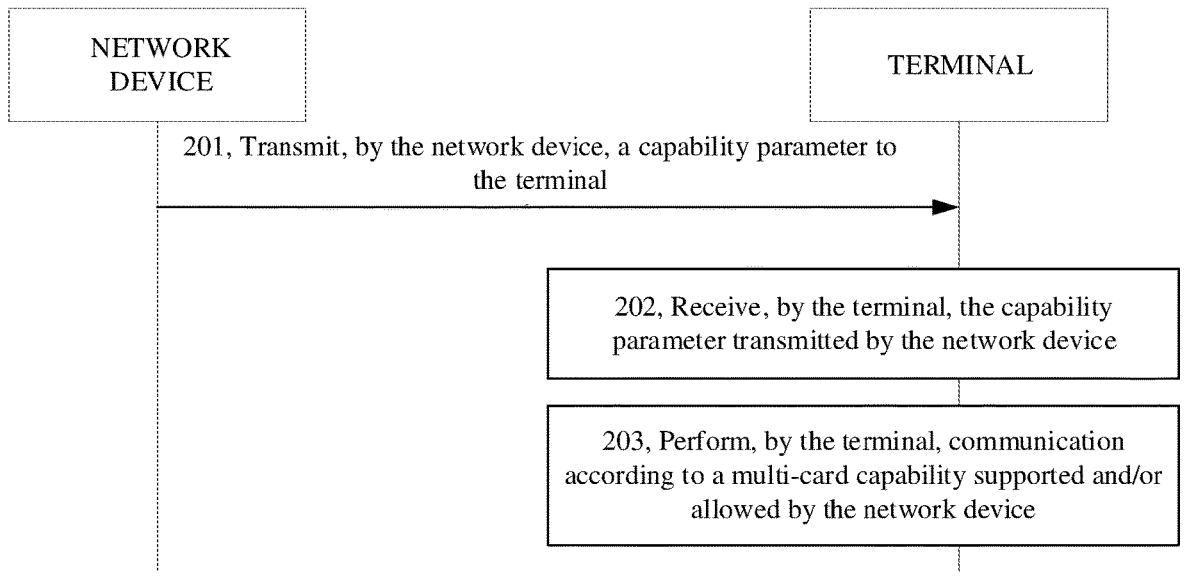
FIG. 2 is a flow chart illustrating a method for information transmission provided in an exemplary implementation of the disclosure.

FIG. 2 is a flow chart illustrating a method for information transmission provided in an exemplary implementation of the disclosure. The method is applied to the terminal and the network device illustrated in FIG. 1 and includes at least part of the following.

At 201, the network device transmits a capability parameter to the terminal.

The capability parameter is used to indicate a multi-card capability supported and/or allowed by the network device. The network device transmits the capability parameter to the terminal, and the terminal determines the multi-card capability supported and/or allowed by the network device according to the capability parameter. In implementations of the disclosure, the network device can transmit the capability parameter to the terminal, and the terminal performs communication based on the multi-card capability supported and/or allowed by the network device.

The following will explain the multi-card capability.

The multi-card capability supported and/or allowed by the network device includes at least one of the following.

(1) Supporting or allowing to add service information to a paging message.

The service information is used to indicate a service type corresponding to a data package that triggers the paging message. The service type indicates a type of a service triggering the paging message. The service type may be a text service, a voice service, a video service, or the like.

The network device has an ability to add service information to a paging message, i.e., the network device can add service information to a paging message transmitted, to indicate a service type corresponding to a data package that triggers the paging message.

When the network device communicates with the terminal, the network device transmits the paging message to the terminal, and once the terminal receives the paging message, the terminal device responds to the paging message. The terminal can use multiple USIMs. If the terminal receives a paging message of a first USIM in the multiple USIMs, the terminal cannot determine whether to switch to network connection corresponding to the first USIM to respond to the paging message. If the network device adds the service information to the paging message, the terminal can determine a service type corresponding to the paging message according to the service information, and then determine whether to respond to the paging message.

Optionally, the network device adds a paging cause parameter to the paging message, where the paging cause parameter is used to indicate the service information. The terminal receives the paging message and reads the paging cause parameter in the paging message, and then can determine a service type based on the paging cause parameter and then determine whether to respond to the paging message.

(2) Supporting or allowing the terminal to switch from a USIM to another USIM to perform a service; and/or supporting or allowing the terminal to switch to time information at which the other USIM performs the service.

If the network device has an ability to support or allow the terminal to switch from a USIM to another USIM to perform a service, and/or an ability to support or allow the terminal to switch to time information at which the other USIM performs the service, the network device allows the terminal to switch from a current USIM to the other USIM to perform the service.

The terminal switching from the USIM to the other USIM to perform the service may refer to that the terminal switches from USIM-1 to USIM-2 to perform the service, or switches from USIM-1 to USIM-3 to perform the service, or other types of switching, which will not be limited herein.

The time information may be a time length, a time point, or the like.

When the network device communicates with the terminal, if the network device supports or allows the terminal to switch from the current USIM to the other USIM to perform communication, the terminal can switch by itself from the current USIM to the other USIM and connect with network connection corresponding to the other USIM to perform communication.

In addition, if the network device supports or allows the terminal to switch to the other USIM to perform the service within a time period, the terminal can switch by itself or network control to the network connection corresponding to the other USIM to perform the service.

In implementations of the disclosure, the multiple USIMs in the terminal correspond to different network connections, the network device informs the terminal that the network device has the ability to support or allow the terminal to switch from a USIM to another USIM to perform a service, and/or the ability to support or allow the terminal to switch to time information at which the other USIM performs the service. The network device can interact with the terminal and allow the terminal to leave network corresponding to the current USIM (e.g., disconnect from the current network) and to access into network corresponding to the other USIM (e.g., establish or recover connection with the network corresponding to the other USIM).

Optionally, the network device can negotiate frequency division multiplexing or time division multiplexing with the terminal, such that the terminal can switch from the current USIM to the other USIM, thereby achieving a bi-pass effect between the network device and the terminal.

The frequency division multiplexing may refer to that the multiple USIMs in the terminal can be used to perform services on different frequencies, and after the network device negotiates the frequency division multiplexing with the terminal, the multiple USIMs in the terminal can respectively be used to perform communication on different frequencies, thereby achieving a bi-pass effect.

The time division multiplexing may refer to that the multiple USIMs in the terminal can be used to perform services at different times, and after the network device negotiates the time division multiplexing with the terminal, since different time intervals can be divided according to the time division multiplexing, the multiple USIMs in the terminal can be used to perform communication in different time intervals, thereby achieving a bi-pass effect.

(3) Supporting or allowing to transmit to the terminal data transmitted to another USIM or service information corresponding to the data through network connection corresponding to a current USIM.

The network device has an ability to transmit to the terminal data of another USIM or service information corresponding to the data through network connection corresponding to the current USIM, and the terminal has an ability to receive the data corresponding to the other USIM or the service information corresponding to the data through the network connection corresponding to the current USIM.

The network device receives the data of the other USIM or the service information corresponding to the data. Since the terminal presently includes the multiple USIMs and uses the network connection corresponding to the current USIM to perform communication, the network device can transmit to the terminal the received data or the received service information corresponding to the data through the network connection corresponding to the current USIM, which can ensure that the terminal can receive the data or the service information corresponding to the data through the network connection corresponding to the current USIM.

The data is DL service data or other types of data.

For example, if the terminal performs communication by using USIM-1, the network device receives DL service data of USIM-2 and can transmit the DL service data of USIM-2 to the terminal through network connection corresponding to USIM-1.

Optionally, the network device can realize that connect a network channel (e.g., a user plane channel) corresponding to a USIM to a network corresponding to another USIM through a dedicated gateway (e.g., a third generation partnership project (3GPP) gateway). The network device can transmit to the terminal data transmitted to the other USIM or service information corresponding to the data through the dedicated gateway in the network corresponding to the current USIM.

The 3GPP gateway may be a non-3GPP inter working function (N3IWF) gateway, an enhanced packet data gateway (ePDG), or other gateways.

Figure 3:
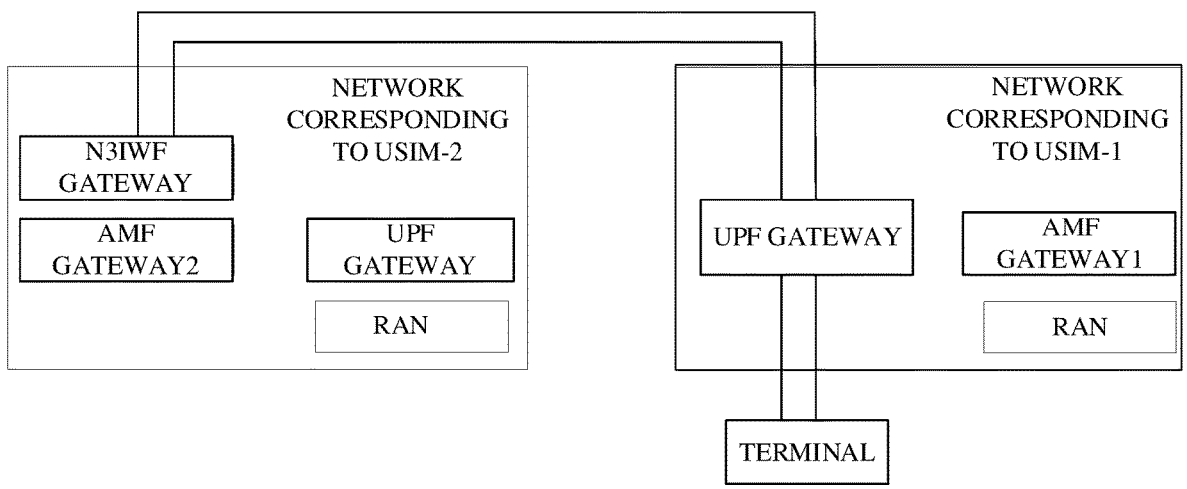
FIG. 3 is a schematic diagram illustrating data transmission provided in an exemplary implementation of the disclosure.

For example, as illustrated in FIG. 3, the terminal includes USIM-1 and USIM-2. In addition, USIM-1 has been registered in a network corresponding to USIM-1 or has been connected with the network corresponding to USIM-1, and USIM-2 has been registered in a network corresponding to USIM-2 or has been connected with the network corresponding to USIM-2. The terminal can establish a secure connection with the N3IWF gateway through the network corresponding to USIM-1, and since the N3IWF gateway is in the network corresponding to USIM-2, data in the network corresponding to USIM-2 or service information corresponding to the data can be transmitted to the terminal through the established secure connection. As such, the terminal also can receive data transmitted by the network corresponding to USIM-2 or service information corresponding to the data even the terminal only keeps connection with the network corresponding to USIM-1.

Optionally, if two USIMs are registered in a same network, the network device receives DL service data of USIM-1, informs currently used USIM-2, and informs through USIM-2 that USIM-1 needs to receive the DL service data. USIM-1 can receive the DL service data through corresponding network connection.

(4) Supporting or allowing the terminal to transmit a request message, to enable the terminal to leave the network connection corresponding to the current USIM within a reference time period.

The reference time period may be determined at a time point at which the terminal leaves the network connection corresponding to the current USIM or at a previous time point. A way to determine the reference time period may be obtained through interactive negotiation between the terminal and the network side or may be a defaulted value.

In the case of that the terminal needs to leave the network connection corresponding to the current USIM, the terminal transmits the request message to the network device, and the network device receives the request message and determines that the terminal leaves the network connection corresponding to the current USIM. Furthermore, the terminal can access into the network connection corresponding to another USIM.

The reference time period is a time period that the terminal accesses into the network connection corresponding to another USIM.

If the network device has an ability to reply to the request message that the terminal is allowed to leave the network connection corresponding to the current USIM, when the network device receives a request that the terminal leaves the network connection corresponding to the current USIM within the reference time period, the network device can reply to a message that the terminal is allowed to leave the network connection corresponding to the current USIM.

Alternatively, if the network device receives the request message transmitted by the terminal but does not reply to the terminal, the terminal can leave by itself the network corresponding to the current USIM.

(5) Supporting or allowing to determine, according to a service list, whether to transmit the paging message to the terminal.

The service list contains service information indicative of that the network device is prohibited from transmitting the paging message to the terminal on condition that the terminal is in a radio resource control inactive (RRC-Inactive) state and/or a connection management idle (CM-IDLE) state.

The network device has an ability to determine based on the service list whether to transmit the paging message to the terminal, and after the network device informs the terminal of the ability, the terminal can directly respond to the paging message received from the network device.

After the network device determines service information that the terminal needs to be paged, the network device firstly determines based on the service list whether the service information is service information indicative of that transmission of the paging message is prohibited. If the service information is determined as the service information indicative of that transmission of the paging message is prohibited, the network device does not transmit a paging message corresponding to the service to the terminal. If the service information is not determined as the service information indicative of that transmission of the paging message is prohibited, the network device transmits the paging message corresponding to the service to the terminal. The terminal determines that the network device has the ability to determine based on a service list whether to transmit a paging message to the terminal. If the terminal receives the paging message from the network device, the terminal directly determines that the paging message needs to be responded, thereby avoiding a condition that whether to respond to the paging message cannot be determined.

Optionally, the service list may be obtained from a server by the network device, obtained by the network device according to a contract message, self-configured by the network device, or transmitted by the terminal to the network device.

Optionally, the network device transmits the capability parameter to the terminal in various manners, and step 201 includes any of step 2011 to step 2013.

At 2011, the network device transmits a broadcast message to the terminal, where the broadcast message contains the capability parameter.

The network device adds the capability parameter to the broadcast message that is transmitted to the terminal, and the terminal receives the broadcast message transmitted by the network device, reads the capability parameter from the broadcast message, and then determines the multi-card capability supported and/or allowed by the network device.

The broadcast message is a system broadcast message of each cell or other broadcast messages.

At 2012, the network device transmits a non-access stratum (NAS) message to the terminal, where the NAS message contains the capability parameter.

The network device adds the capability parameter to the NAS message that is transmitted to the terminal, and the terminal receives the NAS message transmitted by the network device, reads the capability parameter from the NAS message, and then determines the multi-card capability supported and/or allowed by the network device.

The NAS message is a registration reply message, a protocol data unit (PDU) session establishment message, a PDU session modification message, or the like.

At 2013, the network device transmits an access stratum (AS) message to the terminal, where the AS message contains the capability parameter.

The network device adds the capability parameter to the AS message that is transmitted to the terminal, and the terminal receives the AS message transmitted by the network device, reads the capability parameter from the AS message, and then determines the multi-card capability supported and/or allowed by the network device.

The AS message is an RRC message or other messages.

At 202, the terminal receives the capability parameter transmitted by the network device.

At 203, the terminal performs communication according to the multi-card capability supported and/or allowed by the network device.

After the terminal receives the capability parameter transmitted by the network device, the terminal can determine based on the received capability parameter the multi-card capability supported and/or allowed by the network device, and then perform communication by using one of the multiple USIMs based on the multi-card capability supported and/or allowed by the network device.

Optionally, the terminal performing communication by using one of the multiple USIMs includes a terminal behavior determined by the terminal based on the multi-card capability and/or a network selection policy determined by the terminal based on the multi-card capability.

Optionally, the terminal behavior determined by the terminal based on the multi-card capability includes at least one of the following.

(1) The terminal reads service information in a paging message, to determine whether to respond to the service information.

(2) The terminal can switch by itself from a current USIM to another USIM and connect with network connection corresponding to the other USIM to perform communication.

(3) The terminal can receive data of another USIM or service information corresponding to the data through a current USIM.

(4) The terminal transmits a request message to the network device, to inform the network device that the terminal can leave network corresponding to a current USIM.

(5) The terminal can transmit a service list to the network device, to indicate whether the network device can transmit a paging message to the terminal in an RRC-Inactive state and/or a CM-IDLE state.

Optionally, the terminal can determine the network selection policy according to at least one multi-card capability.

The network selection policy may include determination of an accessed cell and/or determination of a selected public land mobile network (PLMN), and may be cell selection, cell reselection, PLMN selection, or the like. For example, if the terminal needs to perform one or more of the above 1 to 5 capabilities, the terminal selects to reside in a network supporting the capability or initiates connection with the network supporting the capability. The capability that the terminal needs to perform may be set by a terminal user, configured by the network, or configured locally.

Figure 4:
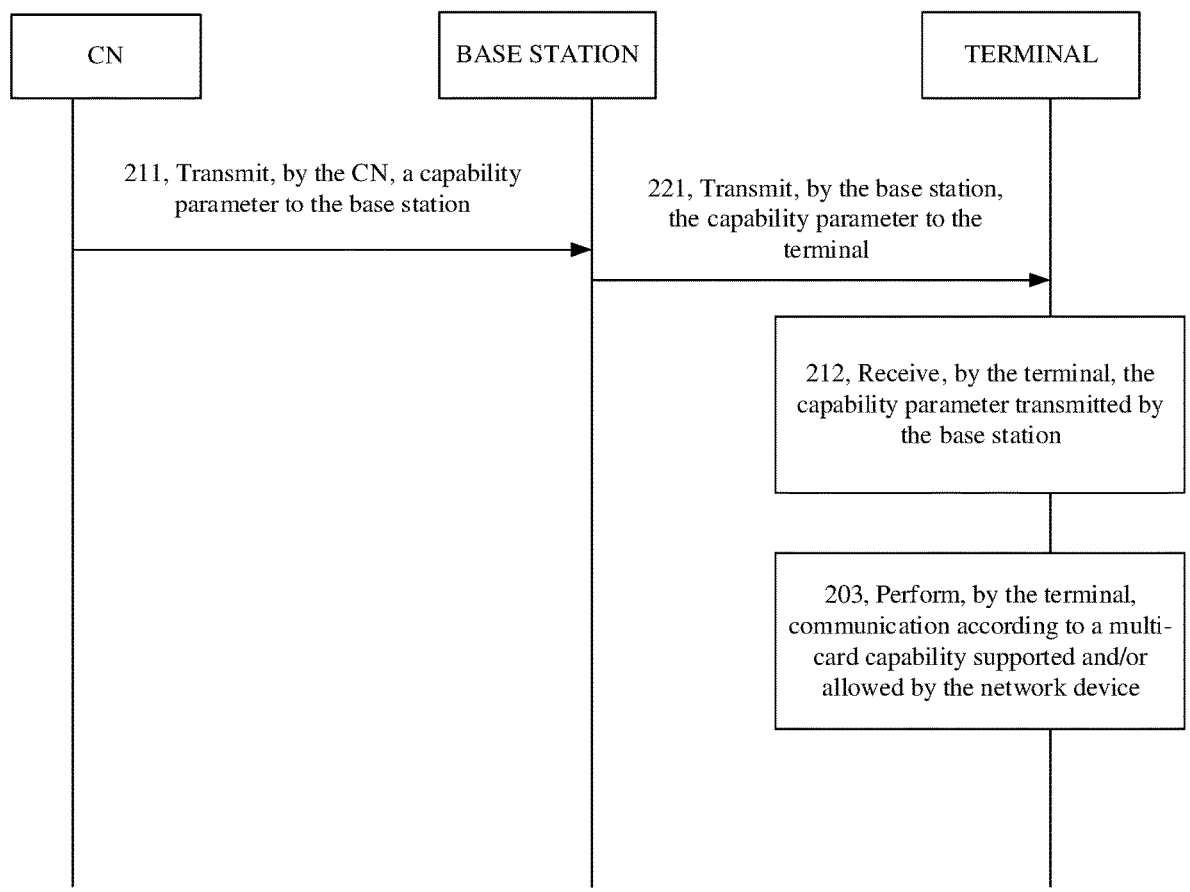
FIG. 4 is a flow chart illustrating a method for information transmission provided in an exemplary implementation of the disclosure.

It needs to be noted that, in implementations of the disclosure, the network device is merely taken as an example for illustration. In another implementation, the network device includes a CN and a base station, and as illustrated in FIG. 4, step 201 may include step 211 to step 221.

At 211, the CN transmits the capability parameter to the base station.

Optionally, during registration, a CN gateway transmits the capability parameter to the base station by using an N2 request message. Alternatively, the CN gateway enables the capability parameter to be carried in a paging message when the CN gateway transmits the paging message to the base station.

At 221, the base station transmits the capability parameter to the terminal.

Correspondingly, step 202 is replaced by step 212 at which the terminal receives the capability parameter transmitted by the base station.

In implementations of the disclosure, the network device can transmit the multi-card capability supported and/or allowed by the network device to the terminal, and the terminal can negotiate with the network device according to the multi-card capability supported and/or allowed by the network device, and adjust communication of the multiple USIMs in the terminal, which is helpful to make services of the multiple USIMs in the terminal not be affected or be less affected. Furthermore, since the services of the multiple USIMs may not be affected or be less affected, it may be also possible to reduce data waste between the network device and the terminal caused by that the services of the USIMs cannot be handled, thus reducing additional overheads of the network device and the terminal.

Figure 5:
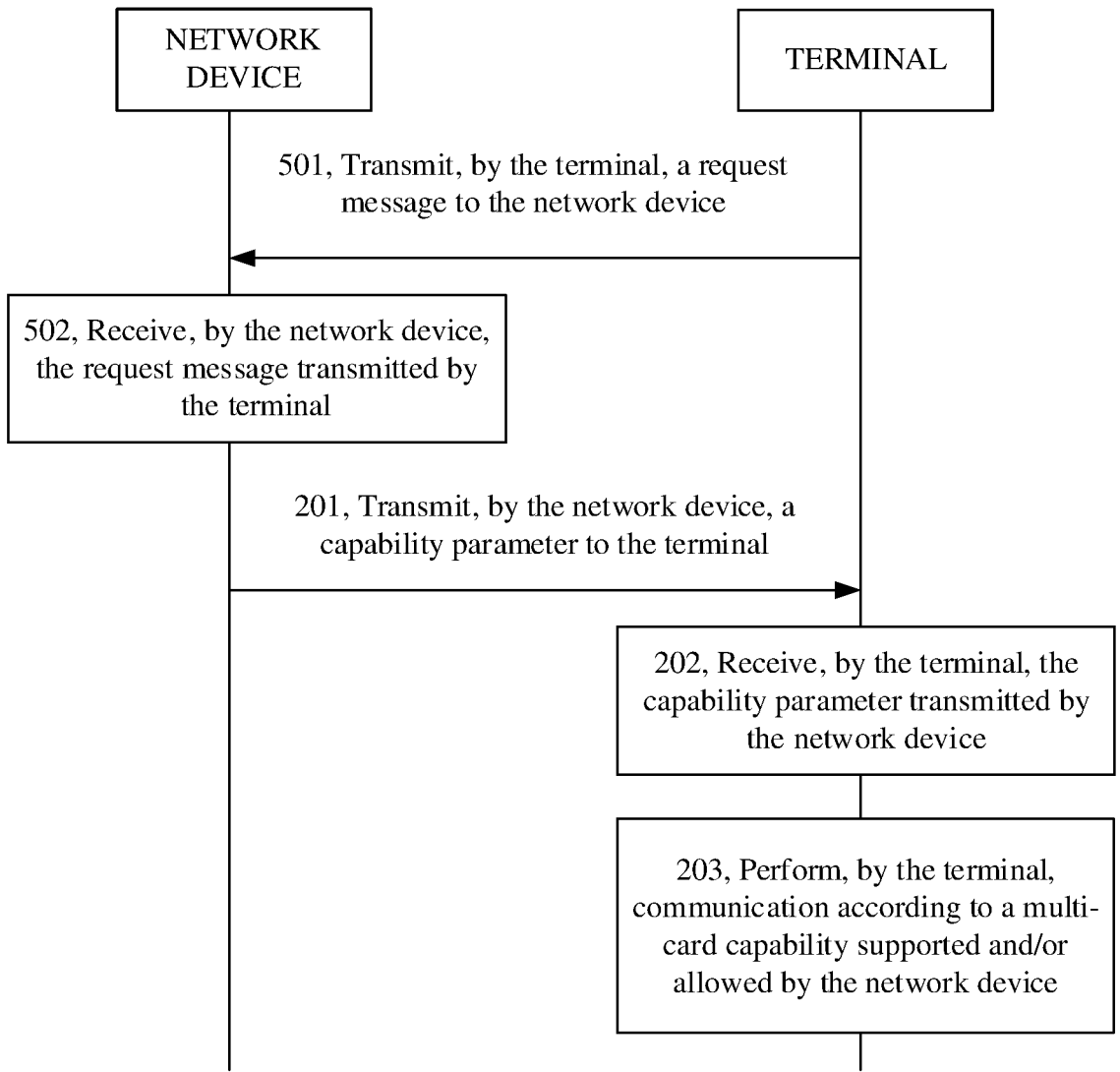
FIG. 5 is a flow chart illustrating a method for request message transmission provided in an exemplary implementation of the disclosure.

In optional implementations based on FIG. 2, FIG. 5 is a flow chart illustrating a method for request message transmission provided in an exemplary implementation of the disclosure. In this implementation, the method further includes the following prior to step 201.

At 501, the terminal transmits a request message to the network device.

The request message is used to indicate obtaining of the multi-card capability supported and/or allowed by the network device. Prior to transmitting the capability parameter by the network device to the terminal, the terminal transmits the request message to the network device and obtains from the network device the multi-card capability supported and/or allowed by the network device.

Optionally, the request message contains a multi-card capability supported and/or requested by the terminal.

When the terminal requests obtaining of the multi-card capability supported and/or allowed by the network device, the terminal transmits the multi-card capability supported and/or requested by the terminal to the network device. Subsequently, the network device can determine the multi-card capability supported and/or allowed by the network device according to the multi-card capability supported and/or requested by the terminal in the request message.

The multi-card capability supported and/or requested by the terminal includes at least one of the following.

(1) Supporting or requesting to read service information in a paging message.

The service information is used to indicate a service type corresponding to a data package that triggers the paging message.

The ability that the terminal supports or allows to read the service information in the paging message corresponds to the ability that the network device supports or allows to add the service information to the paging message, which will not be repeated herein.

(2) Supporting or requesting to switch from a USIM to another USIM to perform the service; and/or supporting or requesting to switch to time information at which the other USIM performs the service.

The ability that the terminal supports or allows to switch from the USIM to another USIM to perform the service and/or supports or allows to switch to time information at which the other USIM performs the service corresponds to the ability that the network device supports or allows the terminal to switch from a USIM to another USIM to perform a service; and/or supports or allows the terminal to switch to time information at which the other USIM performs the service, which will not be repeated herein.

(3) Supporting or requesting to receive data of another USIM or service information corresponding to the data through the network connection corresponding to the current USIM.

The ability that the terminal supports or allows to receive data of another USIM or service information corresponding to the data through the network connection corresponding to the current USIM corresponds to the ability that the network device supports or allows to transmit to the terminal data transmitted to another USIM or service information corresponding to the data through network connection corresponding to the current USIM, which will not be repeated herein.

(4) Supporting or requesting to transmit the request message to the network device, to leave the network connection corresponding to the current USIM within the reference time period.

The ability that the terminal supports or allows to transmit the request message to the network device to leave the network connection corresponding to the current USIM within the reference time period corresponds to the ability that the network device supports or allows the terminal to transmit a request message to enable the terminal to leave the network connection corresponding to the current USIM within the reference time period, which will not be repeated herein.

In addition, when the terminal needs to leave the network connection corresponding to the current USIM, the terminal transmits a request message to the network device to request for leaving the network connection corresponding to the current USIM, and if the network device allows the terminal to leave, the network device returns a reply message to allow the terminal to leave.

The request message contains indication information indicative of leaving of the network connection corresponding to the current USIM, to indicate the network device that the terminal needs to leave the network connection corresponding to the current USIM.

The terminal transmits the request message to the network device, the network device transmits the reply message to the terminal according to the indication information indicative of leaving of the network connection corresponding to the current USIM in the received request message, and the terminal leaves the network connection corresponding to the current USIM according to indication information indicative of that the terminal is allowed to leave in the reply message.

In addition, the request message further contains at least one of a leaving time period or a service list.

Since the terminal has left the network connection corresponding to the current USIM, if the network device receives service data of the current USIM, the network device needs to determine whether to page the terminal. The terminal adds the leaving time period and the service list to the request message, and the network device can determine whether to page the terminal based on at least one of the leaving time period or the service list.

The terminal adds the leaving time period to the request message transmitted, and the network device can determine according to the leaving time period a time moment at which the terminal returns. If the network device receives the paging information within the leaving time period of the terminal, the network device needs to page the terminal.

The terminal also can add the service list to the request message transmitted, where the service list contains the service information indicative of that the network device is prohibited from transmitting the paging message to the terminal on condition that the terminal is in the RRC-Inactive state and/or the CM-IDLE state, and the network device can determine, according to the service list, whether to page the terminal within the leaving time period at which the terminal leaves.

(5) Supporting or requesting to transmit the service list to the network device, such that the network device determines, according to the service list, whether to transmit the paging message to the terminal.

The service list contains the service information indicative of that the network device is prohibited from transmitting the paging message to the terminal on condition that the terminal is in the RRC-Inactive state and/or the CM-IDLE state.

In implementations of the disclosure, the terminal can generate the service information indicative of that the network device is prohibited from transmitting the paging message to the terminal in the RRC-Inactive state or the CM-IDLE state. When the terminal is in the RRC-Inactive state or the CM-IDLE state, if the network device receives a service message in the service list, the network device may not transmit the paging message corresponding to the service message.

Optionally, the multi-card capability supported by the terminal also can be considered as a multi-card capability allowed by the terminal in the disclosure.

Optionally, the terminal can transmit the request message to the network device in various manners. The request message may be an NAS-layer message or an AS-layer message, e.g., a registration request, an RRC establishment request message, or the like. Step 501 also can include step 5011 or step 5012.

At 5011, the terminal transmits a registration request to the network device.

The registration request contains the request message. The terminal adds the request message to the registration request, and subsequently the network device receives the request message and adds the multi-card capability supported and/or allowed by the network device to registration reply information.

At 5012, the terminal transmits an RRC message to the network device.

The RRC message contains the request message. The terminal adds the request message to the RRC message, and subsequently, the network device receives the request message and adds the multi-card capability supported and/or allowed by the network device to the RRC message.

For example, the RRC message may be an RRC establishment request message or other messages.

At 502, the network device receives the request message transmitted by the terminal.

The network device receives the request message transmitted by the terminal, and based on the received request message performs subsequent operations of transmitting the capability parameter to the terminal.

It needs to be noted that, in the implementations of the disclosure, only take performing of step 501 to step 502 as examples for illustration. In another implementation, when step 501 includes step 5011, step 502 includes operations that the network device receives the registration request transmitted by the terminal.

However, when step 501 includes step 5012, step 502 includes operations that the network device receives the RRC establishment message transmitted by the terminal.

In implementations of the disclosure, the terminal requests obtaining of the multi-card capability supported and/or allowed by the network device, such that the terminal can obtain the multi-card capability transmitted by network device when the network device is needed to indicate the multi-card capability, and can adjust communication of the multiple USIMs, thereby improving an accuracy rate of using the multiple USIMs to perform communication.

Figure 6:
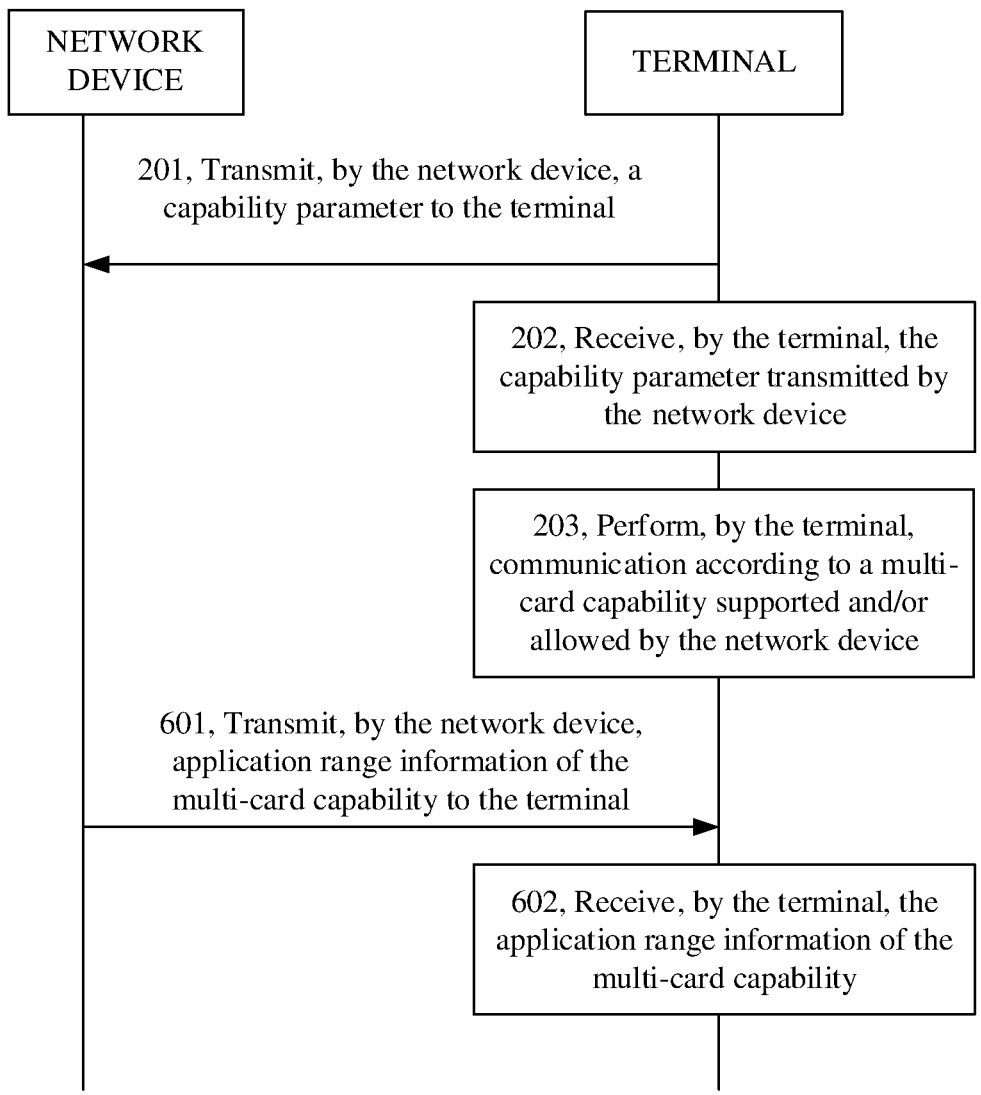
FIG. 6 is a flow chart illustrating a method for capability application range transmission provided in an exemplary implementation of the disclosure.

In optional implementations based on FIG. 2, FIG. 6 is a flow chart illustrating a method for capability application range transmission provided in an exemplary implementation of the disclosure. In the implementation, the method further includes the following.

At 601, the network device transmits application range information of the multi-card capability to the terminal.

The network device transmits capability parameters to the terminal and also can indicate the terminal application ranges of these capability parameters. The network device transmits the application range information of the multi-card capability to the terminal.

The application range information is used to indicate an application range of the multi-card capability of the network device. In addition, the application range information includes different types of information to indicate the application range of the multi-card capability of the network device.

Optionally, the application range information includes at least one of the following.

(1) Position information. The position information is used to indicate a position where the multi-card capability supported by the network device is applicable.

The position information may be a tracking area identity (TAI) list, a cell list, a global positioning system (GPS) coordinate, a base-station node list, or the like.

The terminal receives the position information and can determine according to the position information a position supported by the network device. When the terminal is located at the position indicated by the position information, the terminal determines the multi-card capability supported and/or allowed by the network device.

For example, when the position information is the TAI list, the terminal determines, according to each TAI in the TAI list, a tracking area corresponding to each TAI. When the terminal is located within the tracking area, the terminal supports the multi-card capability.

(2) Radio access type (RAT) information. The RAT information is used to indicate an RAT applicable for the multi-card capability.

The RAT information may contain a type of a base station to which a radio access network (RAN) is accessed into, such as an LTE base station and an NR base station.

For example, if an RAT applicable for the multi-card capability is an NR type, when the terminal is currently connected to the NR base station, the capability is effective.

(3) Time information. The time information is used to indicate a time period at which the multi-card capability is applicable.

For example, if the terminal receives the time information, the terminal can obtain a time period indicated by the time information and determine that the multi-card capability is applicable at the time period.

At 602, the terminal receives the application range information of the multi-card capability.

The terminal receives the application range information of the multi-card capability, and determines the application range of the multi-card capability based on the application range information. When the terminal is located within the application range, the terminal can perform communication according to the multi-card capability.

In implementations of the disclosure, the terminal can determine the received multi-card capability supported and/or allowed by the network device, and then determine the application range of the multi-card capability. When the terminal is located within the application range, the terminal can adjust communication of the multiple USIMs based on the multi-card capability, thereby improving an accuracy rate of performing, by the terminal, communication according to the multi-card capability.

The first point needed to be noted is that, in the implementations of the disclosure, only take that the application range information and parameter information of the multi-card capability are contained in different messages as examples for illustration. In another implementation, the application range information and parameter information of the multi-card capability are contained in a same message, the network device and the terminal have no need to perform step 501 to step 502, and when the network device transmits the capability parameter to the terminal, the network device also can transmit the application range information of the multi-card capability and has no need to transmit separately the application range information of the multi-card capability.

The second point needed to be noted is that, in the implementations of the disclosure, only take that the network device transmits the application range information of the multi-card capability to the terminal as examples for illustration. In another implementation, the terminal can determine the application range information based on default or persistent configuration, i.e., the network device has no need to transmit the application range information of the multi-card capability to the terminal, and the terminal can determine the application range information of the multi-card capability by itself. Since the network device has no need to indicate the terminal the application range of the multi-card capability, message overheads are reduced and an accuracy rate of that the terminal performs communication according to the multi-card capability is improved.

Figure 7:
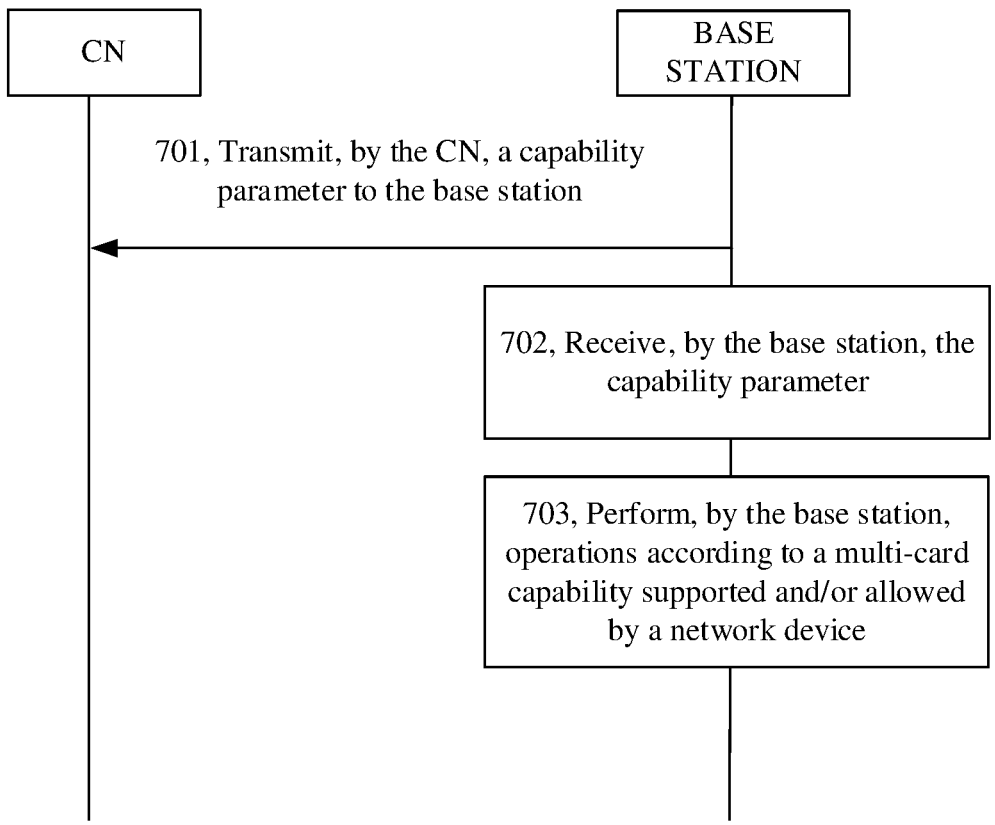
FIG. 7 is a flow chart illustrating a method for information transmission provided in an exemplary implementation of the disclosure.

FIG. 7 is a flow chart illustrating a method for information transmission provided in an exemplary implementation of the disclosure. Referring to FIG. 7, the method is applied between a CN and a base station and includes the following.

At 701, the CN transmits a capability parameter to the base station.

The capability parameter is used to indicate a multi-card capability supported and/or allowed by a network device, and the multi-card capability supported and/or allowed by the network device includes at least one of: supporting or allowing to add service information to a paging message, where the service information is used to indicate a service type corresponding to a data package that triggers the paging message; supporting or allowing a terminal to switch from a USIM to another USIM to perform a service; and/or supporting or allowing the terminal to switch to time information at which the other USIM performs the service; supporting or allowing to transmit to the terminal data transmitted to another USIM or service information corresponding to the data through network connection corresponding to a current USIM; supporting or allowing the terminal to transmit a request message, to enable the terminal to leave the network connection corresponding to the current USIM within a reference time period; or supporting or allowing to determine, according to a service list, whether to transmit the paging message to the terminal, where the service list contains service information indicative of that the network device is prohibited from transmitting the paging message to the terminal on condition that the terminal is in an RRC-Inactive state and/or a CM-IDLE state.

Optionally, during registration, the CN transmits an N2 request message to the base station, where the N2 request message contains the capability parameter.

Alternatively, the CN transmits a paging message to the base station, where the paging message contains the capability parameter.

At 702, the base station receives the capability parameter.

At 703, the base station performs operations according to the multi-card capability supported and/or allowed by the network device.

The base station determines operations during communication with the terminal according to the multi-card capability supported and/or allowed by the network device.

The operations performed by the base station include at least one of the following.

(1) The base station adds service information to a paging message.

The process that the base station adds the service information to the paging message is similar to the process that the service information is added to the paging message in the above implementations, which will not be repeated herein.

(2) The base station allows the terminal to switch from a USIM to another USIM to perform a service, and/or allows the terminal to switch to the time information at which the other USIM performs the service.

The process that the base station allows the terminal to switch from the USIM to the other USIM to perform the service, and/or allows the terminal to switch to the time information at which the other USIM performs the service is similar to the process in the above implementations, which will not be repeated herein.

(3) The base station can transmit to the terminal the data transmitted to the other USIM or the service information corresponding to the data through the network connection corresponding to the current USIM.

The process that the base station can transmit to the terminal the data transmitted to another USIM or the service information corresponding to the data through the network connection corresponding to the current USIM is similar to the process in the above implementations, which will not be repeated herein.

(4) The base station receives the request message transmitted by the terminal, to allow the terminal to leave the network connection corresponding to the current USIM within the reference time period.

The process that the base station receives the request message transmitted by the terminal, to allow the terminal to leave the network connection corresponding to the current USIM within the reference time period is similar to the process in the above implementations, which will not be repeated herein.

(5) The base station determines, according to the service list, whether to transmit the paging message to the terminal.

The process that the base station determines, according to the service list, whether to transmit the paging message to the terminal is similar to the process in the above implementations, which will not be repeated herein.

In implementations of the disclosure, the CN can transmit the multi-card capability supported and/or allowed by the network device to the base station, and the base station can adjust communication of the multiple USIMs in the terminal according to the multi-card capability supported and/or allowed by the network device, which is helpful to make services of the multiple USIMs in the terminal not be affected or be less affected. Furthermore, since the services of the multiple USIMs may not be affected or be less affected, it may be also possible to reduce data waste between the base station and the terminal caused by that the services of the USIMs cannot be handled, thus reducing additional overheads of the base station and the terminal.

Figure 8:
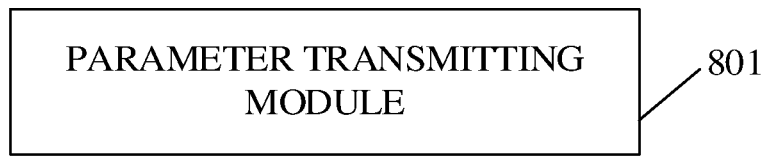
FIG. 8 is a block diagram illustrating an apparatus for information transmission provided in an exemplary implementation of the disclosure.

FIG. 8 is a block diagram illustrating an apparatus for information transmission provided in an exemplary implementation of the disclosure. The apparatus includes a parameter transmitting module 801.

The parameter transmitting module 801 is configured to transmit a capability parameter to a terminal, where the capability parameter is used to indicate a multi-card capability supported and/or allowed by a network device, and the multi-card capability supported and/or allowed by the network device includes at least one of: supporting or allowing to add service information to a paging message, where the service information is used to indicate a service type corresponding to a data package that triggers the paging message; supporting or allowing the terminal to switch from a USIM to another USIM to perform a service; and/or supporting or allowing the terminal to switch to time information at which the other USIM performs the service; supporting or allowing to transmit to the terminal data transmitted to another USIM or service information corresponding to the data through network connection corresponding to a current USIM; supporting or allowing the terminal to transmit a request message, to enable the terminal to leave the network connection corresponding to the current USIM within a reference time period; or supporting or allowing to determine, according to a service list, whether to transmit the paging message to the terminal, where the service list contains service information indicative of that the network device is prohibited from transmitting the paging message to the terminal on condition that the terminal is in an RRC-Inactive state and/or a CM-IDLE state. The terminal performs communication according to the multi-card capability supported and/or allowed by the network device.

In an example, the parameter transmitting module 801 is configured to: transmit a broadcast message to the terminal, where the broadcast message contains the capability parameter; transmit an NAS message to the terminal, where the NAS message contains the capability parameter; or transmit an AS message to the terminal, where the AS message contains the capability parameter.

Figure 9:
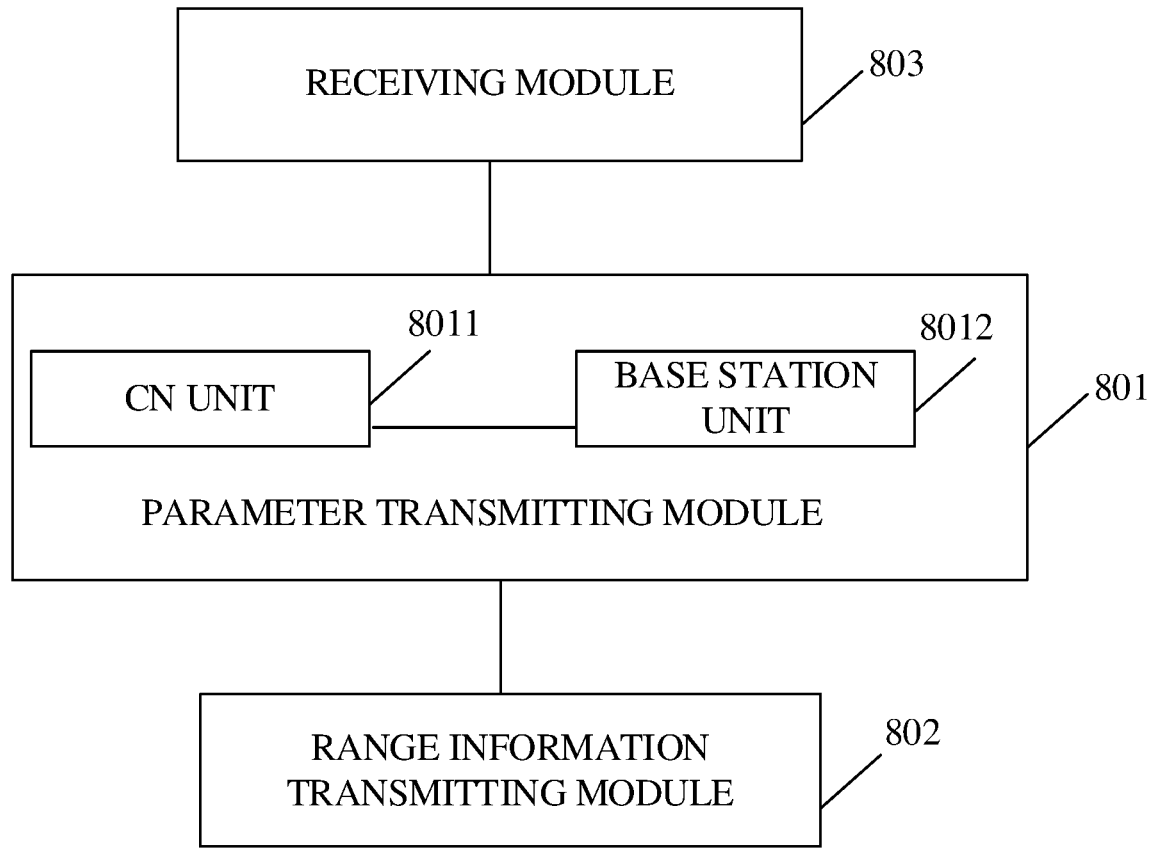
FIG. 9 is a block diagram illustrating an apparatus for information transmission provided in an exemplary implementation of the disclosure.

In an example, referring to FIG. 9, the apparatus further includes a range information transmitting module 802. The range information transmitting module 802 is configured to transmit application range information of the multi-card capability to the terminal, where the application range information includes at least one of: position information used to indicate a position where the multi-card capability supported by the network device is applicable, RAT information used to indicate an RAT applicable for the multi-card capability, or time information used to indicate a time period at which the multi-card capability is applicable.

In an example, referring to FIG. 9, the apparatus further includes a receiving module 803. The receiving module 803 is configured to receive the request message transmitted by the terminal, where the request message is used to indicate obtaining of the multi-card capability supported and/or allowed by the network device.

In an example, the request message contains a multi-card capability supported and/or requested by the terminal.

In an example, referring to FIG. 8, the parameter transmitting module 801 includes a CN unit 8011 and a base station unit 8012. The CN unit 8011 is configured to transmit the capability parameter to the base station unit 8012. The base station unit 8012 is configured to transmit the capability parameter to the terminal.

Figure 10:
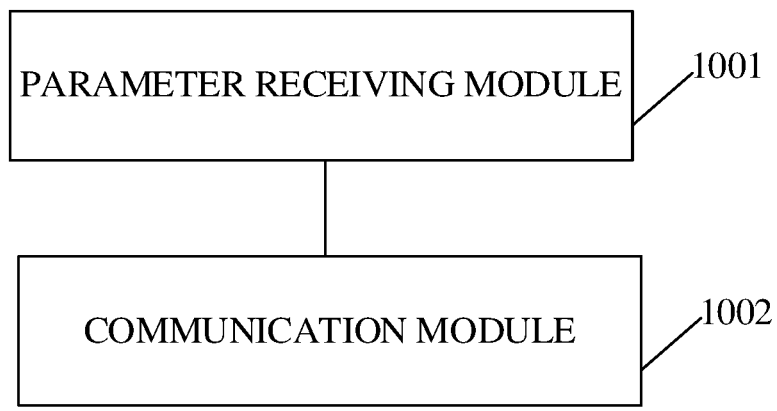
FIG. 10 is a block diagram illustrating an apparatus for information transmission provided in an exemplary implementation of the disclosure.

FIG. 10 is a block diagram illustrating an apparatus for information transmission provided in an exemplary implementation of the disclosure. The apparatus includes a parameter receiving module 1001 and a communication module 1002. The parameter receiving module 1001 is configured to receive a capability parameter, where the capability parameter is used to indicate a multi-card capability supported and/or allowed by a network device, and the multi-card capability supported and/or allowed by the network device includes at least one of: supporting or allowing to add service information to a paging message, where the service information is used to indicate a service type corresponding to a data package that triggers the paging message; supporting or allowing a terminal to switch from a USIM to another USIM to perform a service; and/or supporting or allowing the terminal to switch to time information at which the other USIM performs the service; supporting or allowing to transmit to the terminal data transmitted to another USIM or service information corresponding to the data through network connection corresponding to a current USIM; supporting or allowing the terminal to transmit a request message, to enable the terminal to leave the network connection corresponding to the current USIM within a reference time period; or supporting or allowing to determine, according to a service list, whether to transmit the paging message to the terminal, where the service list contains service information indicative of that the network device is prohibited from transmitting the paging message to the terminal on condition that the terminal is in an RRC-Inactive state and/or a CM-IDLE state. The communication module 1002 is configured to perform communication according to the multi-card capability supported and/or allowed by the network device.

Figure 11:
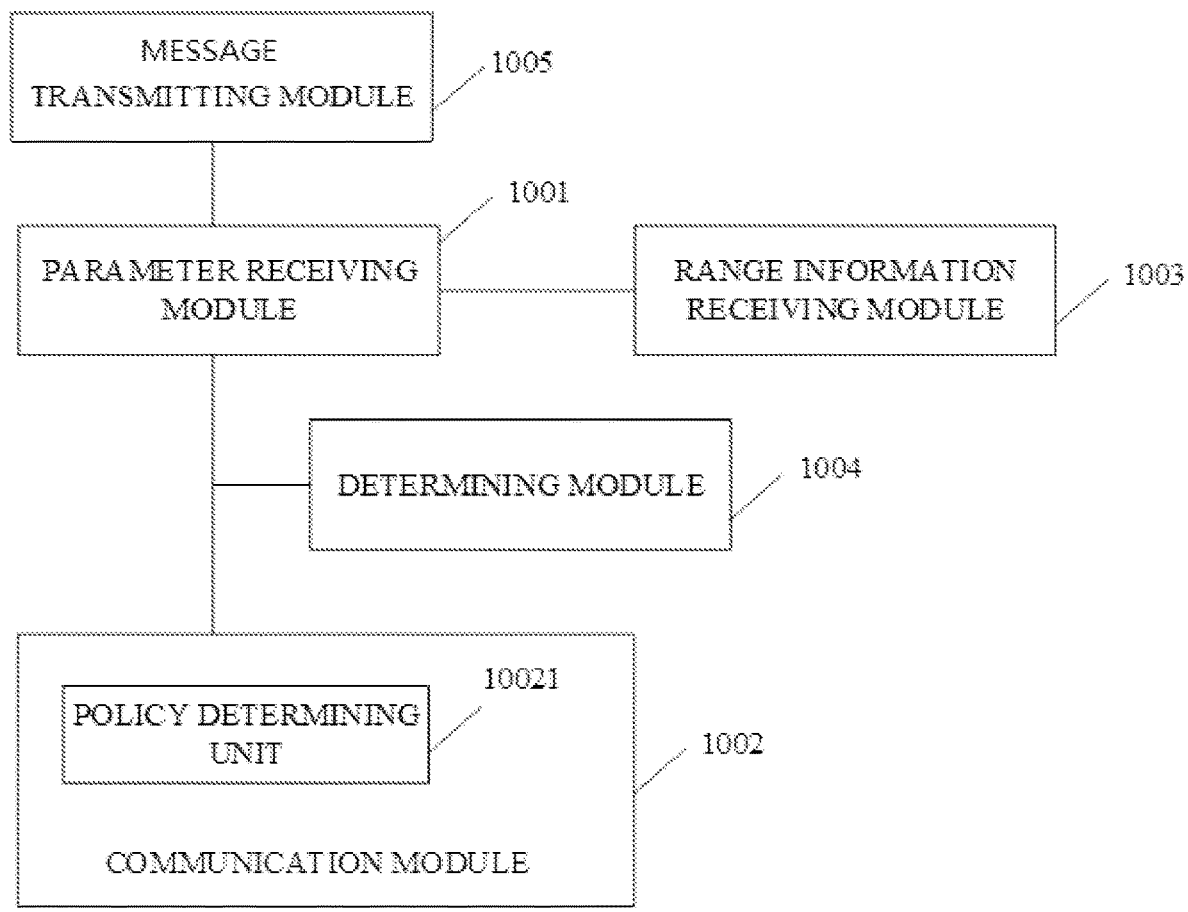
FIG. 11 is a block diagram illustrating an apparatus for information transmission provided in an exemplary implementation of the disclosure.

In an example, referring to FIG. 11, the apparatus further includes a range information receiving module 1003. The range information receiving module 1003 is configured to receive application range information of the multi-card capability, where the application range information includes at least one of: position information used to indicate a position where the multi-card capability supported by the network device is applicable, RAT information used to indicate an RAT applicable for the multi-card capability, or time information used to indicate a time period at which the multi-card capability is applicable.

In an example, referring to FIG. 11, the apparatus further includes a determining module 1004. The determining module 1004 is configured to determine an application range of the multi-card capability, where the application range includes at least one of: a position where the multi-card capability supported by the network device is applicable, an RAT applicable for the multi-card capability, or a time period at which the multi-card capability is applicable.

In an example, referring to FIG. 11, the communication module 1002 includes a policy determining unit 10021. The policy determining unit 10021 is configured to determine a network selection policy according to the multi-card capability supported and/or allowed by the network device.

In an example, the network selection policy includes determination of an accessed cell and/or determination of a selected PLMN.

In an example, referring to FIG. 11, the apparatus further includes a message transmitting module 1005. The message transmitting module 1005 is configured to transmit the request message to the network device, where the request message is used to indicate obtaining of the multi-card capability supported and/or allowed by the network device.

In an example, the request message contains a multi-card capability supported and/or requested by the terminal.

In an example, the message transmitting module 1005 is configured to: transmit a registration request to the network device, where the registration request contains the request message; or transmit an RRC message to the network device, where the RRC message contains the request message.

In an example, the multi-card capability supported and/or requested by the terminal includes at least one of: supporting or requesting to read service information in a paging message, where the service information is used to indicate the service type corresponding to the data package that triggers the paging message; supporting or requesting to switch from a USIM to another USIM to perform the service; and/or supporting or requesting to switch to the time information at which the other USIM performs the service; supporting or requesting to receive data of another USIM or service information corresponding to the data through the network connection corresponding to the current USIM; supporting or requesting to transmit the request message to the network device, to leave the network connection corresponding to the current USIM within the reference time period; or supporting or requesting to transmit the service list to the network device, to enable that the network device determines, according to the service list, whether to transmit the paging message to the terminal, where the service list contains the service information indicative of that the network device is prohibited from transmitting the paging message to the terminal on condition that the terminal is in the RRC-Inactive state and/or the CM-IDLE state.

Figure 12:
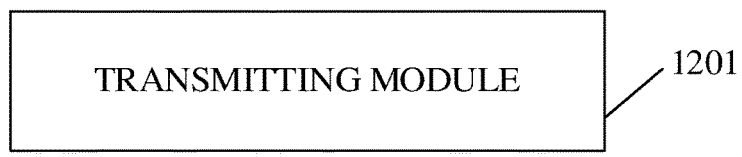
FIG. 12 is a block diagram illustrating an apparatus for information transmission provided in an exemplary implementation of the disclosure.

FIG. 12 is a block diagram illustrating an apparatus for information transmission provided in an exemplary implementation of the disclosure. The apparatus is applied to a CN and includes a transmitting module 1201. The transmitting module 1201 is configured to transmit a capability parameter to a base station, where the capability parameter is used to indicate a multi-card capability supported and/or allowed by a network device, and the multi-card capability supported and/or allowed by the network device includes at least one of: supporting or allowing to add service information to a paging message, where the service information is used to indicate a service type corresponding to a data package that triggers the paging message; supporting or allowing a terminal to switch from a USIM to another USIM to perform a service; and/or supporting or allowing the terminal to switch to time information at which the other USIM performs the service; supporting or allowing to transmit to the terminal data transmitted to another USIM or service information corresponding to the data through network connection corresponding to a current USIM; supporting or allowing the terminal to transmit a request message, to enable the terminal to leave the network connection corresponding to the current USIM within a reference time period; or supporting or allowing to determine, according to a service list, whether to transmit the paging message to the terminal, where the service list contains service information indicative of that the network device is prohibited from transmitting the paging message to the terminal on condition that the terminal is in an RRC-Inactive state and/or a CM-IDLE state. The base station performs operations according to the multi-card capability supported and/or allowed by the network device.

Figure 13:
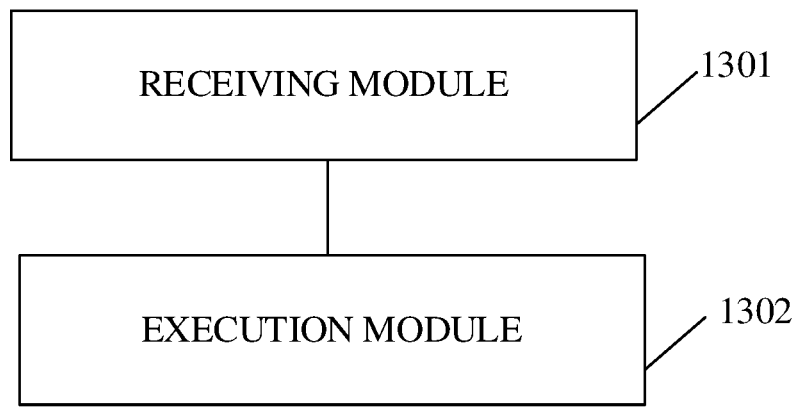
FIG. 13 is a block diagram illustrating an apparatus for information transmission provided in an exemplary implementation of the disclosure.

FIG. 13 is a block diagram illustrating an apparatus for information transmission provided in an exemplary implementation of the disclosure. The apparatus is applied to a base station and includes a receiving module 1301 and an execution module 1302. The receiving module 1301 is configured to receive a capability parameter, where the capability parameter is used to indicate a multi-card capability supported and/or allowed by a network device, and the multi-card capability supported and/or allowed by the network device includes at least one of: supporting or allowing to add service information to a paging message, where the service information is used to indicate a service type corresponding to a data package that triggers the paging message; supporting or allowing a terminal to switch from a USIM to another USIM to perform a service; and/or supporting or allowing the terminal to switch to time information at which the other USIM performs the service; supporting or allowing to transmit to the terminal data transmitted to another USIM or service information corresponding to the data through network connection corresponding to a current USIM; supporting or allowing the terminal to transmit a request message, to enable the terminal to leave the network connection corresponding to the current USIM within a reference time period; or supporting or allowing to determine, according to a service list, whether to transmit the paging message to the terminal, where the service list contains service information indicative of that the network device is prohibited from transmitting the paging message to the terminal on condition that the terminal is in an RRC-Inactive state and/or a CM-IDLE state. The execution module 1302 is configured to perform operations according to the multi-card capability supported and/or allowed by the network device.

In an example, performing the operations according to the multi-card capability supported and/or allowed by the network device includes at least one of: adding the service information to the paging message, where the service information is used to indicate the service type corresponding to the data package that triggers the paging message; allowing the terminal to switch from the USIM to another USIM to perform the service; and/or allowing the terminal to switch to time information at which the other USIM performs the service; transmitting to the terminal the data transmitted to another USIM or the service information corresponding to the data through the network connection corresponding to the current USIM; receiving the request message transmitted by the terminal, to allow the terminal to leave the network connection corresponding to the current USIM within the reference time period; or determining, according to the service list, whether to transmit the paging message to the terminal, where the service list contains the service information indicative of that the network device is prohibited from transmitting the paging message to the terminal on condition that the terminal is in the RRC-Inactive state and/or the CM-IDLE state.

Figure 14:
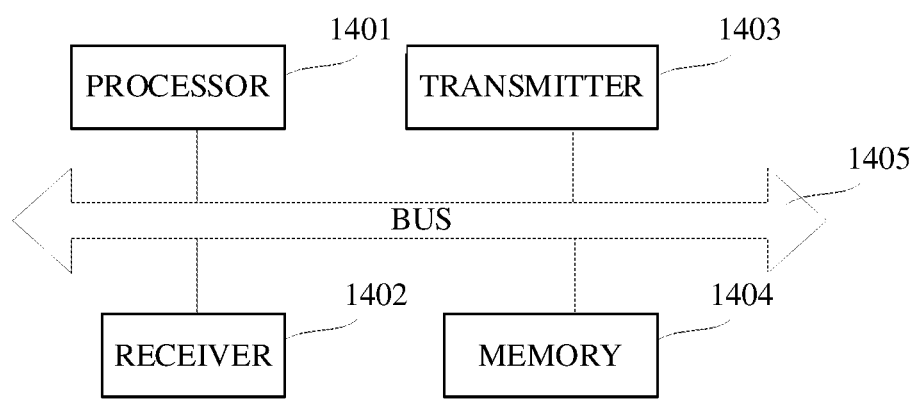
FIG. 14 is a schematic structural diagram illustrating a communication device provided in an exemplary implementation of the disclosure.

FIG. 14 is a schematic structural diagram illustrating a communication device provided in an exemplary implementation of the disclosure. The communication device (terminal or network device) includes a processor 1401, a receiver 1402, a transmitter 1403, a memory 1404, and a bus 1405.

The processor 1401 includes one or more processing cores and is configured to perform various function applications and information processing by running software programs and modules.

The receiver 1402 and the transmitter 1403 can be implemented as a communication component, where the communication component may be a communication chip.

The memory 1404 is coupled with the processor 1401 via the bus 1405.

The memory 1404 is configured to store at least one instruction which is executed by the processor 1401 to implement various operations in the foregoing method implementations.

In addition, the memory 1404 can be implemented by various types of volatile or non-volatile storage devices, or a combination thereof. The volatile or non-volatile storage device includes but is not limited to: a magnetic disc, an optical disc, an electrically erasable programmable read-only memory (EEPROM), an erasable programmable read-only memory (EPROM), a static random access memory (SRAM), a read-only memory (ROM), a magnetic memory, a flash memory, or a programmable read-only memory (PROM).

In exemplary implementations, a computer-readable storage medium is further provided. The computer-readable storage medium is configured to store executable instructions which are loaded and executed by a processor to implement the method for information transmission performed by the communication device in the foregoing method implementations.

Those of ordinary skill in the art may understand that all or part of the steps in the foregoing implementations may be implemented by a hardware or a program instructing relevant hardware. The program may be stored in a computer-readable storage medium. The above storage medium may include a ROM, a magnetic disc, an optical disc, or the like.

The above is only an optional implementation of the disclosure and is not intended to limit the disclosure. Any modification, equivalent arrangements, and improvement made within the spirit and principles of the disclosure shall be included in the scope of protection of the disclosure.

What is claimed is:

1. A method for information transmission, the method being executed by a network device and comprising:
receiving a request message transmitted by a terminal, wherein the request message contains a multi-card capability supported by the terminal; and
transmitting a capability parameter to the terminal, the capability parameter being used to indicate a multi-card capability supported by the network device, and the multi-card capability supported by the network device comprising:

supporting to determine, according to a service list, whether to transmit a paging message to the terminal, wherein the service list contains service information, and the network device is prohibited from transmitting the paging message to the terminal on condition that service information that the terminal needs to be paged is the service information in the service list and the terminal is in at least one of a radio resource control inactive (RRC-Inactive) state or a connection management idle (CM-IDLE) state; wherein the terminal performs communication according to the multi-card capability supported by the network device.

2. The method of claim 1, wherein transmitting the capability parameter to the terminal comprises:
transmitting a non-access stratum (NAS) message to the terminal, wherein the NAS message contains the capability parameter; or
transmitting an access stratum (AS) message to the terminal, wherein the AS message contains the capability parameter.

3. The method of claim 1, wherein the network device comprises a core network (CN) and a base station, and transmitting the capability parameter to the terminal comprises:
transmitting, by the CN, the capability parameter to the base station; and
transmitting, by the base station, the capability parameter to the terminal.

4. A method for information transmission, the method being performed by a terminal and comprising:
transmitting a request message to a network device, wherein the request message contains a multi-card capability supported by the terminal; and
receiving a capability parameter from the network device, the capability parameter being used to indicate a multi-card capability supported by the network device, and the multi-card capability supported by the network device comprising:
supporting to determine, according to a service list, whether to transmit a paging message to the terminal, wherein the service list contains service information, and the network device is prohibited from transmitting the paging message to the terminal on condition that service information that the terminal needs to be paged is the service information in the service list and the terminal is in at least one of a radio resource control inactive (RRC-Inactive) state or a connection management idle (CM-IDLE) state; and
performing communication according to the multi-card capability supported by the network device.

5. The method of claim 4, wherein receiving the capability parameter comprises:
receiving a non-access stratum (NAS) message from the network device, wherein the NAS message contains the capability parameter; or
receiving an access stratum (AS) message from the network device, wherein the AS message contains the capability parameter.

6. The method of claim 4, wherein transmitting the request message to the network device comprises:
transmitting a registration request to the network device, the registration request containing the request message; or
transmitting an RRC message to the network device, the RRC message containing the request message.

7. A network device, comprising:
a transceiver;
a processor; and
a memory storing a computer program;
the computer program being executed by the processor to cause the transceiver to:
receive a request message transmitted by a terminal, wherein the request message contains a multi-card capability supported by the terminal; and
transmit a capability parameter to the terminal, the capability parameter being used to indicate a multi-card capability supported by the network device, and the multi-card capability supported by the network device comprising:
supporting to determine, according to a service list, whether to transmit a paging message to the terminal, wherein the service list contains service information, and the network device is prohibited from transmitting the paging message to the terminal on condition that service information that the terminal needs to be paged is the service information in the service list and the terminal is in at least one of a radio resource control inactive (RRC-Inactive) state or a connection management idle (CM-IDLE) state; wherein the terminal performs communication according to the multi-card capability supported by the network device.

8. The network device of claim 7, wherein the transceiver caused to transmit the capability parameter to the terminal is caused to:
transmit a non-access stratum (NAS) message to the terminal, wherein the NAS message contains the capability parameter; or
transmit an access stratum (AS) message to the terminal, wherein the AS message contains the capability parameter.

9. The network device of claim 7, wherein the network device comprises a core network (CN) and a base station, wherein:
the CN is configured to transmit the capability parameter to the base station; and
the base station is configured to transmit the capability parameter to the terminal.

10. A terminal, comprising:
a transceiver;
a processor; and
a memory storing a computer program;
the computer program being executed by the processor to cause the transceiver to:
transmit a request message to a network device, wherein the request message contains a multi-card capability supported by the terminal; and
receive a capability parameter from the network device, the capability parameter being used to indicate a multi-card capability supported by the network device, and the multi-card capability supported by the network device comprising:
supporting to determine, according to a service list, whether to transmit a paging message to the terminal, wherein the service list contains service information, and the network device is prohibited from transmitting the paging message to the terminal on condition that service information that the terminal needs to be paged is the service information in the service list and the terminal is in at least one of a radio resource control inactive (RRC-Inactive) state or a connection management idle (CM-IDLE) state; and the computer program being further executed by the processor to cause the processor to perform communication according to the multi-card capability supported by the network device.

11. The terminal of claim 10, wherein the transceiver caused to receive the capability parameter is caused to:

receive a non-access stratum (NAS) message from the network device, wherein the NAS message contains the capability parameter; or receive an access stratum (AS) message from the network device, wherein the AS message contains the capability parameter.

12. The terminal of claim 10, wherein the transceiver caused to transmit the request message to the network device is caused to:

transmit a registration request to the network device, wherein the registration request contains the request message; or transmit an RRC message to the network device, wherein the RRC message contains the request message.

13. The method of claim 1, wherein the multi-card capability supported by the network device further comprises:

supporting to add service information to a paging message, wherein the service information indicates a service type corresponding to a data package that triggers the paging message, wherein the service type is a voice service, and the service information is indicated by a paging cause parameter added to the paging message by the network device.

14. The method of claim 4, wherein the multi-card capability supported by the network device further comprises:

supporting to add service information to a paging message, wherein the service information indicates a service type corresponding to a data package that triggers the paging message, wherein the service type is a voice service, and the service information is indicated by a paging cause parameter added to the paging message by the network device.

15. The network device of claim 7, wherein the multi-card capability supported by the network device further comprises:

supporting to add service information to a paging message, wherein the service information indicates a service type corresponding to a data package that triggers the paging message, wherein the service type is a voice service, and the service information is indicated by a paging cause parameter added to the paging message by the network device.

16. The terminal of claim 10, wherein the multi-card capability supported by the network device further comprises:

supporting to add service information to a paging message, wherein the service information indicates a service type corresponding to a data package that triggers the paging message, wherein the service type is a voice service, and the service information is indicated by a paging cause parameter added to the paging message by the network device.

* * * * *